US012755538B2

(12) United States Patent
Mathuraju et al.

(10) Patent No.: US 12,755,538 B2
(45) **Date of Patent: *Oct. 6, 2026**

(54) SYSTEM GATEWAY ANALYSIS

(71) Applicant: Honeywell International Inc., Charlotte, NC (US)

(72) Inventors: Siva Sankar Mathuraju, Bengaluru (IN); Kanhayia Kumar, Bengaluru (IN); Gaddigesh Nagappa Admani, Bengaluru (IN); Sameer Tripathi, Bengaluru (IN); Suneel Kunkati, West Godavari (IN)

(73) Assignee: Honeywell International Inc., Charlotte, NC (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/976,525

(22) Filed: Dec. 11, 2024

(65) Prior Publication Data

US 2025/0104430 A1 Mar. 27, 2025

Related U.S. Application Data

(63) Continuation of application No. 17/889,574, filed on Aug. 17, 2022, now Pat. No. 12,183,077.

(51) Int. Cl.

*G06V 20/50* (2022.01)
*G08B 29/02* (2006.01)
*H04W 88/02* (2009.01)

(52) U.S. Cl.

CPC ............ *G06V 20/50* (2022.01); *G08B 29/02* (2013.01); *H04W 88/02* (2013.01)

(58) Field of Classification Search

CPC ........ G06V 20/50; G08B 29/02; H04W 88/02
See application file for complete search history.

(56) References Cited

U.S. PATENT DOCUMENTS 9,854,653 B1 12/2017 Ackmann et al.
9,980,337 B1 5/2018 Coombes et al.
(Continued)

FOREIGN PATENT DOCUMENTS

AU 2020356625 A1 * 4/2022 .......... H04W 64/003
EP 3758336 A1 12/2020
(Continued)

OTHER PUBLICATIONS

Chen , et al., "BIM-based augmented reality inspection and maintenance of fire safety equipment"; Science Direct, vol. 110, Feb. 2020 (3 pgs) https://www.sciencedirect.com/science/article/abs/pii/S0926580518309956?via%3Dihub.
(Continued)

*Primary Examiner* — Chico A Foxx
(74) *Attorney, Agent, or Firm* — Brooks, Cameron & Huebsch, PLLC

(57) ABSTRACT

Devices, systems, and methods for system gateway analysis are described herein. In some examples, one or more embodiments include a mobile device comprising a memory and a processor to execute instructions stored in the memory to scan a building system gateway of a control system, generate gateway data about the building system gateway from the scan, transmit the gateway data to a remote computing device, receive, from the remote computing device, supplemented gateway information for the building system gateway, and generate, based on the supplemented gateway information, a system gateway analysis.

20 Claims, 4 Drawing Sheets

(56) References Cited

U.S. PATENT DOCUMENTS

| | | | | |
|---|---|---|---|---|
| 10,297,129 | B2 | 5/2019 | Piccolo, III | |
| 10,410,424 | B1 | 9/2019 | Khokhar et al. | |
| 11,064,009 | B2 | 7/2021 | Nadumane et al. | |
| 2007/0293232 | A1 | 12/2007 | Nonaka | |
| 2012/0154141 | A1 | 6/2012 | Piccolo, III | |
| 2013/0285808 | A1 | 10/2013 | Piccolo, III | |
| 2013/0311656 | A1 | 11/2013 | Liekens et al. | |
| 2014/0096215 | A1 | 4/2014 | Hessler | |
| 2015/0066782 | A1 | 3/2015 | Vainberg et al. | |
| 2016/0086045 | A1* | 3/2016 | Roberts | G05B 15/02 382/183 |
| 2016/0165570 | A1* | 6/2016 | Kim | H04W 4/029 455/456.2 |
| 2017/0034483 | A1 | 2/2017 | Aghdasi et al. | |
| 2017/0091998 | A1 | 3/2017 | Piccolo, III | |
| 2017/0249745 | A1 | 8/2017 | Fiala | |
| 2017/0352257 | A1* | 12/2017 | Oliver | H04W 4/33 |
| 2018/0367947 | A1* | 12/2018 | Kim | H04W 4/021 |
| 2019/0132738 | A1 | 5/2019 | Zhang et al. | |
| 2019/0180602 | A1* | 6/2019 | Han | H04W 4/025 |
| 2019/0371148 | A1 | 12/2019 | Bailey | |
| 2020/0084864 | A1 | 3/2020 | Klecha et al. | |
| 2020/0226583 | A1 | 7/2020 | Bhat | |
| 2020/0286364 | A1 | 9/2020 | Meruva et al. | |
| 2020/0409643 | A1 | 12/2020 | Huie et al. | |
| 2020/0412580 | A1 | 12/2020 | Meruva et al. | |
| 2021/0027613 | A1 | 1/2021 | Sahai et al. | |
| 2021/0049750 | A1 | 2/2021 | Poosa | |
| 2021/0097837 | A1* | 4/2021 | Saldin | G08B 17/06 |
| 2021/0125321 | A1 | 4/2021 | Iwamura et al. | |
| 2021/0162927 | A1 | 6/2021 | Takii et al. | |
| 2021/0256722 | A1* | 8/2021 | Staab | G01S 17/894 |
| 2022/0129846 | A1 | 4/2022 | Montgomery et al. | |
| 2022/0219032 | A1 | 7/2022 | Sahai et al. | |
| 2022/0299023 | A1 | 9/2022 | Guglielmo et al. | |
| 2022/0391853 | A1 | 12/2022 | Seymour et al. | |
| 2023/0194864 | A1* | 6/2023 | Karri | G06T 19/006 345/8 |
| 2023/0315036 | A1* | 10/2023 | Evans | G05B 19/042 700/28 |
| 2023/0316754 | A1 | 10/2023 | Gintautas | |
| 2024/0272926 | A1* | 8/2024 | Lu | G05B 15/02 |
| 2025/0238006 | A1* | 7/2025 | Peskin | G05B 19/4186 |

FOREIGN PATENT DOCUMENTS

| | | | |
|---|---|---|---|
| EP | 4033467 | A1 | 7/2022 |
| KR | 101409964 | B1 | 6/2014 |

OTHER PUBLICATIONS

JLG Industries, Inc., "Augmented Reality App"; Facility Executive—Creating Intelligent Buildings, Mar. 18, 2020 (2 pgs) https://facilityexecutive.com/2020/03/jlg-introduces-augmented-reality-app/.

* cited by examiner

SYSTEM GATEWAY ANALYSIS

PRIORITY INFORMATION

This application is a Continuation of U.S. application Ser. No. 17/889,574, filed Aug. 17, 2022, the contents of which are incorporated herein by reference in its entirety.

TECHNICAL FIELD

The present disclosure relates to devices, systems, and methods for system gateway analysis.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system may include a system gateway, a control panel, and/or a number of event devices (e.g., sensors, flashers, sounders, pull stations, etc.) located throughout the facility (e.g., on different floors and/or in different rooms of the facility) that can perform an action when an event is occurring in the facility and provide a notification of the event to a user (e.g., a building/facility manager) and/or the occupants of the facility via visible means, audible means, or other mechanisms.

DETAILED DESCRIPTION

Figure 1:
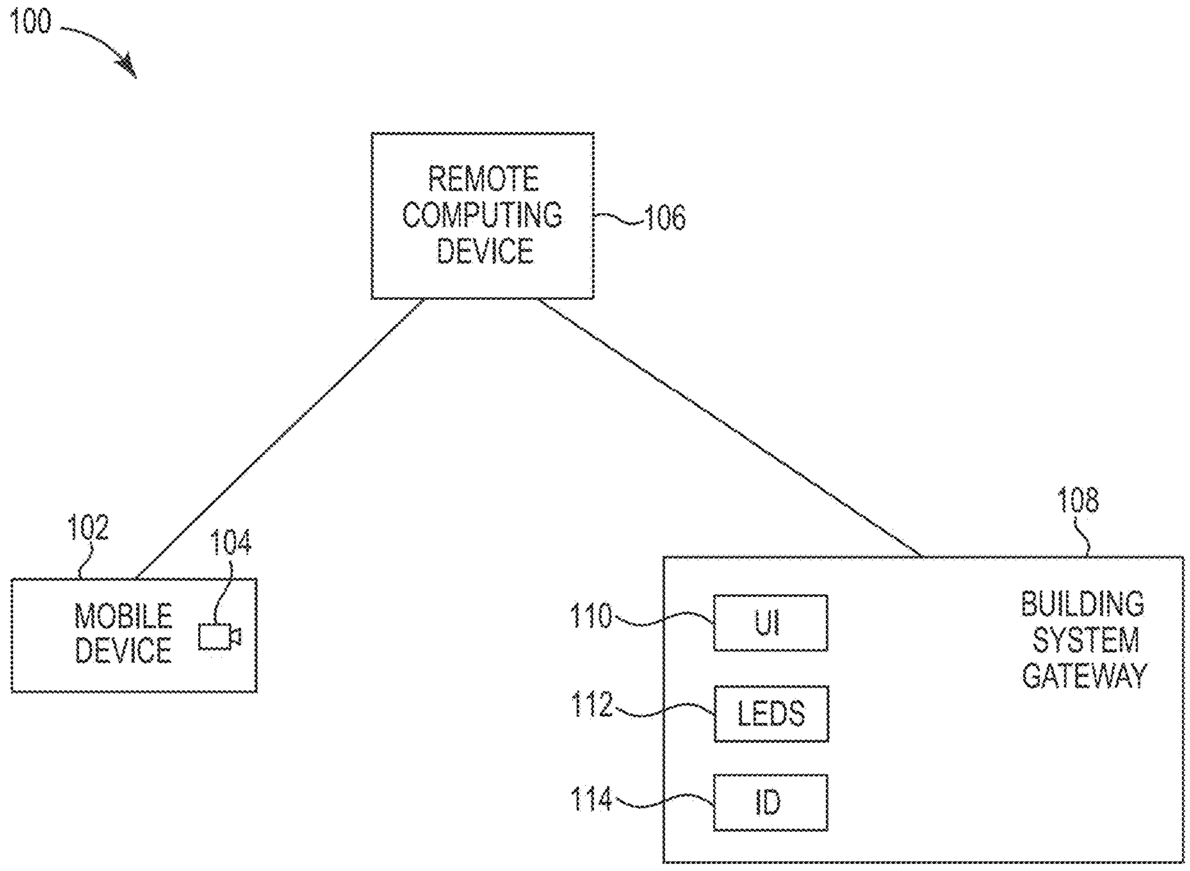
FIG. 1 is an example of a system for a system gateway analysis, in accordance with one or more embodiments of the present disclosure.

Devices, systems, and methods for system gateway analysis are described herein. In some examples, one or more embodiments include a mobile device comprising a memory and a processor to execute instructions stored in the memory to scan a building system gateway of a control system, generate gateway data about the building system gateway from the scan, transmit the gateway data to a remote computing device, receive, from the remote computing device, supplemented gateway information for the building system gateway, and generate, based on the supplemented gateway information, a system gateway analysis.

Facilities can include various control systems. Such control systems can include security systems, emergency systems, alarm systems, etc. Such control systems may include event devices such as cameras, motion sensors, fire sensors, smoke detectors, heat detectors, carbon monoxide (CO) detectors, or combinations of these; interfaces; manual call points (MCPs); pull stations; input/output modules; aspirating units; sprinkler controls; and/or audio/visual devices (e.g., speakers, sounders, flashers, buzzers, microphones, cameras, video displays, video screens, etc.), relay output modules, among other types of event devices.

Such event devices may be connected to a building system gateway. As used herein, the term "building system gateway" refers to a device that provides a communication link between a control panel for event devices, a remote computing device, and peripheral devices. For example, the building system gateway can enable transmission of data from control panel(s) of the facility to a cloud computing platform (e.g., the remote computing device), as well as accessibility to the control panel(s) by a peripheral device (e.g., a mobile device).

During installation, commissioning, and/or maintenance of such control systems, a user may have to consult manuals and/or consult with subject matter expert peer groups. The user may, for example, have questions during setup of such a control system, and locate product manuals to find answers to such questions. In another example, the user may have to call a support line to consult with an expert in such a control system to find answers to such questions. In either case, the user may take valuable time to find such answers. Additionally, since the user may install and/or maintain many different control systems in different facilities, each facility's control system may differ slightly. As a result, even a simple task such as troubleshooting a building system gateway by reading a user interface (UI) of the gateway and/or reading light emitting diodes (LEDs) of the gateway to diagnose issues may differ by facility. Accordingly, commissioning and/or maintenance of such systems may be a time consuming and therefore costly endeavor.

System gateway analysis, according to the present disclosure, can allow for a mobile device to scan a device within a system to easily determine information about the device and/or the system. Utilizing the scan of the device, supplemented gateway information can be utilized to generate a system gateway analysis that can be viewed by a user to help the user install, commission, and/or troubleshoot various systems in a facility without the need to consult manuals or calling support lines, saving the user valuable time. Such an approach can allow for a faster and more efficient, as well as lower cost installation, commissioning, and/or maintenance process, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element “02” in FIG. 1, and a similar element may be referenced as 202 in FIG. 2.

As used herein, “a”, “an”, or “a number of” something can refer to one or more such things, while “a plurality of” something can refer to more than one such things. For example, “a number of components” can refer to one or more components, while “a plurality of components” can refer to more than one component.

FIG. 1 is an example of a system 100 for a system gateway analysis, in accordance with one or more embodiments of the present disclosure. The system 100 can include a mobile device 102, a remote computing device 106, and a building system gateway 108.

As mentioned above, the system 100 can be included in a facility, a space in a facility, etc. Such a system 100 can be a control system having various alarm systems, such as security systems, emergency systems, etc. The system 100 can include the building system gateway 108 to provide a communication link between a control panel for various event devices of the system 100 (e.g., not illustrated in FIG. 1 for clarity and so as not to obscure embodiments of the present disclosure) and the remote computing device 106. Additionally, the building system gateway 108 can allow for the mobile device 102 to access and/or determine information about event devices of the system 100.

The mobile device 102 can be included in the system 100. As used herein, a mobile device can include devices that are (or can be) carried and/or worn by the user. Mobile device 102 can be a phone (e.g., a smart phone), a tablet, a personal digital assistant (PDA), a laptop, smart glasses, and/or a wrist-worn device (e.g., a smart watch), among other types of mobile devices. Although not illustrated in FIG. 1 for clarity and so as not to obscure embodiments of the present disclosure, the mobile device 102 can include a UI, as is further described in connection with FIG. 2.

The mobile device 102 can include a camera 104. As used herein, the term “camera” refers to a device to capture a visual image. The visual image can be still images and/or successive images that can produce a video. The mobile device 102 can utilize the camera 104 to scan the building system gateway 108, as is further described herein.

The building system gateway 108 can include a UI 110. As used herein, the term “UI” refers to a location where user-computing device interaction occurs. A user of the building system gateway 108 can interact with the building system gateway 108 via UI 110. For example, UI 110 can provide (e.g., display and/or present) information to the user of the building system gateway 108, and/or receive information from (e.g., input by) the user of the building system gateway 108. For instance, in some embodiments, UI 110 can be a graphical user interface (GUI) that can provide information to and/or receive information from the user of the building system gateway 108. The UI 110 can be, for instance, a touchscreen (e.g., the GUI can include touchscreen capabilities). Alternatively, the UI 110 can be any other type of display device connected to the building system gateway 108 and configured to receive a video signal output from the building system gateway 108.

The UI 110 can display information about the building system gateway 108, about control panel(s) associated with the building system gateway 108, and/or about event devices associated with the building system gateway 108. For example, the UI 110 can display information about events detected by the system 100 (e.g., security events, emergency events, etc.), health information about devices in the system 100, etc.

The building system gateway 108 can include LEDs 112. The LEDs 112 can display different colors in various patterns which can be indicative of information about the building system gateway 108, about control panel(s) associated with the building system gateway 108, and/or about event devices associated with the building system gateway 108. For example, the LEDs 112 can indicate health information about the building system gateway 108 (e.g., a fault has occurred in the building system gateway 108, in a different device in the system 100, etc.), an event being detected (e.g., by a fire sensor in the system 100), among other information.

The building system gateway 108 can include an identifier 114. As used herein, the term “identifier” refers to an object that establishes a unique identity of another object. The identifier 114 can be, for example, a barcode, a quick response (QR) code, a serial number, and/or any other type of distinctive identifier that can establish a unique identity to the building system gateway 108. The identifier 114 can be utilized to differentiate between the building system gateway 108 and other building system gateways and/or any other devices in the system 100.

Although the building system gateway 108 is illustrated in FIG. 1 as including a UI 110, LEDs 112, and an identifier 114, embodiments of the present disclosure are not so limited. For example, the building system gateway 108 can include any combination of UI 110, LEDs 112, and identifier 114 (e.g., a UI 110 and LEDs 112 but not an identifier 114, etc.). Further, in some embodiments, the identifier 114 may be displayed on the UI 110.

As illustrated in FIG. 1, the mobile device 102 and the building system gateway 108 can be connected to the remote computing device 106. The mobile device 102 and the building system gateway 108 can be connected to the remote computing device 106 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As mentioned above, the mobile device 102 can scan the building system gateway 108 via the camera 104. For example, the camera 104 can scan the UI 110, the LEDs 112, and/or the identifier 114, as is further described herein.

In some examples, mobile device 102 can scan, via the camera 104, the UI 110 of the building system gateway 108. For example, the camera 104 can capture information presented on the UI 110 of the building system gateway. Such information can include information about the building system gateway 108, about control panel(s) associated with the building system gateway 108, and/or about event devices associated with the building system gateway 108, among other types of information.

In some examples, mobile device 102 can scan, via the camera 104, the LEDs 112 of the building system gateway 108. For example, the camera 104 can capture the color of the LEDs 112, which LEDs 112 are turned on/enabled, which LEDs 112 are turned off/disabled, and/or a combination thereof that results in a particular pattern formed by the LEDs 112. Such colors/patterns can correspond to information about the building system gateway 108, about control panel(s) associated with the building system gateway 108, and/or about event devices associated with the building system gateway 108, among other types of information.

In some examples, the mobile device 102 can scan, via the camera 104, an identifier 114. For example, the camera 104 can capture the identifier 114 to establish the particular building system gateway 108 in the system 100 the mobile device 102 is scanning. Such information can be utilized to correlate the gateway data captured by the scan with panel metadata stored in the remote computing device 106, as is further described herein.

As mentioned above, in some examples, the system 100 may include multiple building system gateways 108 and/or other devices. A particular user may be allowed to access information regarding certain devices in the system 100 but not others. Accordingly, the mobile device 102 can include predetermined permissions associated with a user account for the user. The predetermined permissions can allow a user to scan certain ones of the devices in the system 100 but not others. For example, the mobile device 102 can scan the building system gateway 108 in response to the predetermined permissions associated with the user account of the user including the building system gateway 108. In an instance in which the mobile device 102 does not include predetermined permissions associated with the user account of the user for the building system gateway 108, the mobile device 102 can prevent the camera 104 from scanning the building system gateway 108 or prevent gateway data from being generated (e.g., as is further described herein). In some examples, the mobile device 102 can determine whether the mobile device 102 includes the predetermined permissions based on a scan of the identifier 114. In some examples, the mobile device 102 can determine whether the mobile device 102 includes the predetermined permissions based on a proximity of the mobile device 102 with the building system gateway 108 (e.g., the mobile device 102 wirelessly communicates with the building system gateway 108 when the mobile device 102 is within a threshold distance of the building system gateway 108).

In response to the scan of the building system gateway 108, the mobile device 102 can generate gateway data about the building system gateway 108 from the scan. For example, information presented on the UI 110, colors/patterns of the LEDs 112, and/or an identifier 114 captured by the camera 104 can be included in gateway data generated after the scan of the building system gateway 108. Accordingly, the gateway data can include status information of the building system gateway 108 and/or identifying information of the building system gateway 108 from the scan. The identifying information can include a serial number of the building system gateway 108 and/or a serial number of a control panel associated with the building system gateway 108. Such gateway data can be transmitted to the remote computing device 106 for correlation with building system gateway metadata, as is further described herein.

During operation of the system 100, the building system gateway 108 can transmit building system gateway metadata to the remote computing device 106 at predetermined intervals. Building system gateway metadata can be utilized to summarize information about other data. For example, such data may summarize operational information regarding the building system gateway 108, devices in communication with the building system gateway 108 (e.g., control panel(s), event device(s), etc.), information describing the facility the system 100 is included in, etc. The building system gateway 108 can transmit building system gateway metadata at the predetermined interval, including every minute, every hour, every day, etc. Further, the predetermined interval can be configurable. In some examples, the building system gateway 108 may transmit building system gateway metadata to the remote computing device 106 at a predetermined interval that is faster during daytime/peak business hours (e.g., every minute from 8:00 AM to 5:00 PM) than during nighttime/non-peak hours (e.g., every five minutes from 5:01 PM to 7:59 AM).

In some examples, the building system gateway metadata can include metadata describing the type of facility. For example, the building system gateway metadata may include metadata describing whether the facility that includes system 100 is a restaurant, commercial space, office space, warehouse, etc.

In some examples, the building system gateway metadata can include metadata describing a facility topology. For example, the building system gateway metadata may include metadata describing how many event devices are in a facility, the type of event devices included in the facility, the spacing/density of the event devices in the facility (e.g., how many event devices in a particular space/how many event devices per square foot, etc.), among other types of facility topology metadata.

In some examples, the building system gateway metadata can include metadata describing a status of devices in the system 100. For example, the building system gateway metadata may include metadata describing health status of devices (e.g., whether a device is working correctly, whether a device has a fault, current readings of the device, etc.)

In some examples, the building system gateway metadata can include metadata describing event information. For example, the building system gateway metadata may include metadata describing whether events are detected by event devices in the facility, types of events detected, event devices which detected the events, etc.

While the building system gateway 108 is described above as transmitting facility type metadata, facility topology metadata, device status metadata, and/or event information metadata, embodiments of the present disclosure are not so limited. For example, the building system gateway 108 can transmit any other type of metadata to the remote computing device 106 at any predetermined interval.

As described above, the mobile device 102 can transmit the gateway data to the remote computing device 106. For example, gateway data can include status information of the building system gateway 108 and/or identifying information of the building system gateway 108 from the scan. The remote computing device 106 can receive the gateway data from the mobile device 102.

Once the remote computing device 106 receives the gateway data from the mobile device 102, the remote computing device 106 can generate supplemented gateway information. Supplemented gateway information can include gateway data correlated with building system gateway metadata. For example, a scan of a pattern/color of the LEDs 112 (e.g., that indicates a fault with the building system gateway 108) can be correlated with building system gateway metadata indicating the building system gateway 108 has a fault, allowing for a type of fault to be determined, when the fault occurred, the device having the fault (e.g., the building system gateway 108), among other information to be presented in a system gateway analysis, as is further described herein. As another example, a scan of the UI 110 (e.g., that indicates an event was detected by an event device in the system 100) can be correlated with building system gateway metadata indicating an event device in the facility detected the event, allowing for the type of event device that detected the event to be determined, the type of event detected to be determined, which event device detected the event, where the event device is located in the facility, when the event was detected, etc.

Additionally, in some examples, the supplemented gateway information can include metadata from other building system gateways associated with the user account. For example, the user account of the mobile device 102 may include predetermined permissions to scan other building system gateways and/or other devices in the system 100 (e.g., not illustrated in FIG. 1 for clarity and so as not to obscure embodiments of the present disclosure). The remote computing device 106 may include metadata from the other building system gateways/other devices in the system 100. Such information may be used to supplement the supplemented gateway information. For example, if a second building system gateway included a fault similar to a fault experienced by the building system gateway 108, the remote computing device 106 can generate the supplemented gateway information including the gateway data (e.g., transmitted by the mobile device 102 to the remote computing device 106), gateway metadata of the building system gateway 108, and the gateway metadata of the second building system gateway. Such additional information may help a user diagnose and/or troubleshoot the building system gateway 108.

In response to the remote computing device 106 generating the supplemented gateway information, the remote computing device 106 can transmit the supplemented gateway information to the mobile device 102. Accordingly, the mobile device 102 can receive, from the remote computing device 106, the supplemented gateway information for the building system gateway 108.

Accordingly, the mobile device 102 can generate, based on the supplemented gateway information, a system gateway analysis for the building system gateway 108. The system gateway analysis can include setup information for the system 100, status information for the system 100 (e.g., and for devices within the system 100), and/or troubleshooting information for the system 100 (e.g., and for devices within the system 100), as is further described in connection with FIG. 2.

In some examples, the mobile device 102 can display the system gateway analysis in an augmented reality (AR) environment via a user interface of the mobile device 102. As used herein, the term "augmented reality" refers to a computing device generated scenario that simulates experience through senses and perception. An AR environment can be an environment in which a virtual/augmented reality experience provided to a user by providing video, images, and/or other visual stimuli to the user via a UI of a display. For example, the mobile device 102 may provide an overlay transparent or semi-transparent screen in front of a user's eyes such that reality is "augmented" with additional information such as graphical representations and supplemental data. In such an instance, the UI of the mobile device 102 may display the building system gateway 108, as well as augmented graphical representations and/or supplemental data provided in a system gateway analysis, as is further described in connection with FIG. 2.

Figure 2:
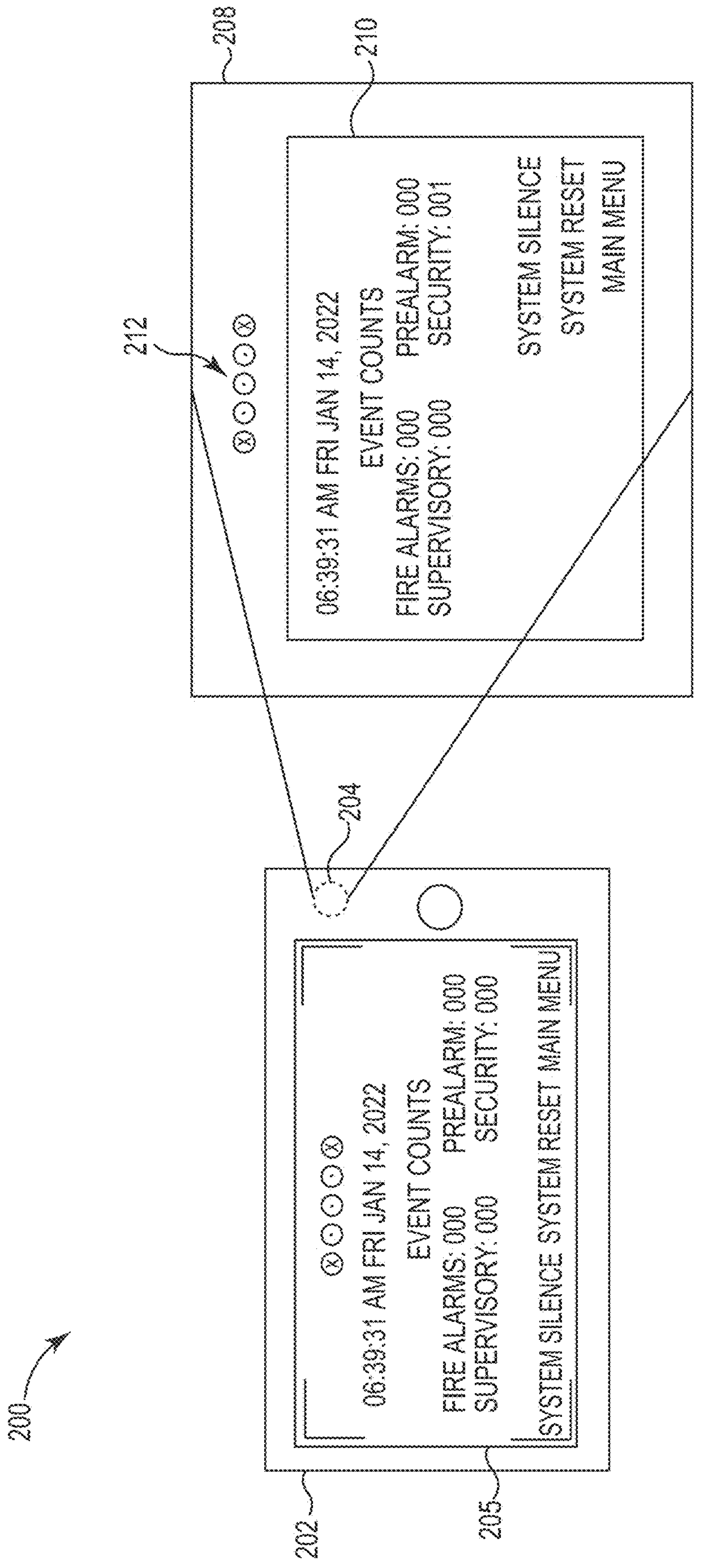
FIG. 2 is an example of a system in which a mobile device scans a building system gateway and generates a system gateway analysis, in accordance with one or more embodiments of the present disclosure.

FIG. 2 is an example of a system 200 in which a mobile device 202 scans a building system gateway 208 and generates a system gateway analysis 216, in accordance with one or more embodiments of the present disclosure. The system 200 can include the mobile device 202 and the building system gateway 208.

As illustrated in FIG. 2, the mobile device 202 is scanning a building system gateway 208 of a control system. For example, the mobile device 202 can include a camera 204 which can scan the building system gateway 208, as is further described herein.

In some examples, the mobile device 202 can scan, via the camera 204, the UI 210 of the building system gateway 208. For example, the camera 204 can scan the information presented on the UI 210, including the current time (e.g., 6:39 AM) and date (Friday, Jan. 14, 2022), any detected events (e.g., zero fire alarms, zero pre-alarms, zero supervisory alarms, one security alarm), as well as other possible interactions (e.g., selection of system silence, system reset, and/or main menu).

In some examples, the mobile device 202 can scan, via the camera 204, the LEDs 212 of the building system gateway 208. For example, the camera 204 can scan the LEDs 212 to capture the color of the LEDs 212, which LEDs 212 are turned on/enabled (e.g., indicated in FIG. 2 by the circle filled with a dot), which LEDs 212 are disabled (e.g., indicated in FIG. 2 by the circle filled with an X), and/or a combination thereof that results in a particular pattern formed by the LEDs 212. For example, the camera 204 can capture the pattern formed by the middle three LEDs being turned on and being a green color, where the outer two LEDs are turned off.

In some examples, the mobile device 202 can scan, via the camera 204, the identifier 214. For example, the identifier 214 can be a serial number associated with the building system gateway 208.

The mobile device 202 can generate gateway data about the building system gateway 208 from the scan. For example, the gateway data can include the current time, the detected security alarm, the pattern of the LEDs 212, and the serial number as the identifier 214. The mobile device 202 can, accordingly, transmit the gateway data to a remote computing device.

The remote computing device can generate supplemented gateway information with the gateway data and with building system gateway metadata. For example, correlating the gateway data (e.g., the current time, the detected security alarm, and the pattern of the LEDs 212) with building system gateway metadata (e.g., an event device in the facility detected the security event, which event device detected the security event, where the event device is located, and when the security event was detected) can result in supplemented gateway information.

The mobile device 202 can receive the supplemented gateway information for the building system gateway 208 from the remote computing device. Utilizing the supplemented gateway information, the mobile device 202 can generate a system gateway analysis, as is further described herein.

In some examples, the system gateway analysis 216 can include status information for the system 200. For example, the system gateway analysis can include the current status of the system 200 and associated devices, including the building system gateway 208 and the event device that detected the security event. For example, the system gateway analysis can include the current time, the date, the detected security alarm, and the pattern of the LEDs 212, an event device in the facility detected the security event, which event device detected the security event, where the event device is located, and when the security event was detected, etc.

As illustrated in FIG. 2, the mobile device 202 further includes a UI 205. The mobile device 202 can display the system gateway analysis 216 via the UI 205. For example, the UI 205 can display the current time (e.g., 6:39 AM), the current date (e.g., Friday, Jan. 14, 2022), the detected security alarm, and the pattern of the LEDs 212. In addition, as previously described in connection with FIG. 1, the system gateway analysis 216 can be displayed in an AR environment via the UI 205. The UI 205 may provide additional information overlayed onto the UI 205 in the AR environment to augment the information scanned by the camera 204. The overlayed information can include, for example, which event device detected the security event, where the event device is located, and when the security event was detected, etc. The event device that detected the security event may be shown on a virtual map displayed on the UI 205, the time the security event was detected may be displayed on the UI 205, directions from the location of the mobile device 202 to the location of the event device that detected the security event may be displayed on the UI 205, among other types of overlayed information in the AR environment.

In another example, the camera 204 may scan the building system gateway 208 and system gateway analysis 216 can include troubleshooting information as a result of a fault. For example, the LEDs 212 may include a pattern of the middle three LEDs 212 being on and colored red. The camera 204 may scan the LEDs 212 and receive supplemented gateway information from the remote computing device (e.g., the scan of the pattern/color of the LEDs is correlated with building system gateway metadata indicating the building system gateway 208 has a fault, what the fault is, how the fault was caused, etc.). Accordingly, the UI 205 can display, via the UI 205, the system gateway analysis including troubleshooting information for the system 200.

The UI 205 may provide additional information overlayed onto the UI 205 in the AR environment to augment the information scanned by the camera 204. In this example, the overlayed information can include an indication that the building system gateway 208 has a fault, when the fault occurred, an indication (e.g., textual, an icon, etc.) of what the fault is (e.g., a short circuit), as well as step-by-step instructions on how to address the fault. For instance, as the user interacts with the building system gateway 208, steps overlayed on the UI 205 in the system gateway analysis 216 are updated in real time to instruct the user of the mobile device 202 how to address the detected fault.

In another example, the camera 204 may scan the building system gateway 208 during an initial setup of the building system gateway 208 and system gateway analysis 216 can include setup information for the system 200. For example, the camera 204 can scan the identifier 214 and receive supplemented gateway information from the remote computing device (e.g., the identifier is correlated with building system gateway metadata indicating the building system gateway 208 has not been setup). Accordingly, the UI 205 can display, via the UI 205, the system gateway analysis including setup information for the building system gateway 208.

The UI 205 may provide additional information overlayed onto the UI 205 in the AR environment to augment the information scanned by the camera 204. In this example, the overlayed information can include step-by-step setup instructions for the building system gateway 208. For instance, as the user interacts with the building system gateway 208, steps overlayed on the UI 205 in the system gateway analysis 216 are updated in real time to instruct the user of the mobile device 202 how to setup the building system gateway 208.

Although the system gateway analysis 216 is described above as including troubleshooting information, status information, and/or setup information, embodiments of the present disclosure are not so limited. For example, the system gateway analysis 216 can include any other information to enable a user to install, commission, and/or troubleshoot various devices within the system 200.

Accordingly, system gateway analysis according to the present disclosure can allow for a mobile device to scan a device, such as a building system gateway, in order to easily determine information about the building system gateway in the system, other devices in the system, and/or about the system as a whole. Such scanned information can be supplemented with metadata on a remote computing device and can be provided in an AR environment via the mobile device via a system gateway analysis. Such an approach can allow for a faster and more efficient, as well as lower cost installation, commissioning, and/or maintenance process, as compared with previous approaches.

Figure 3:
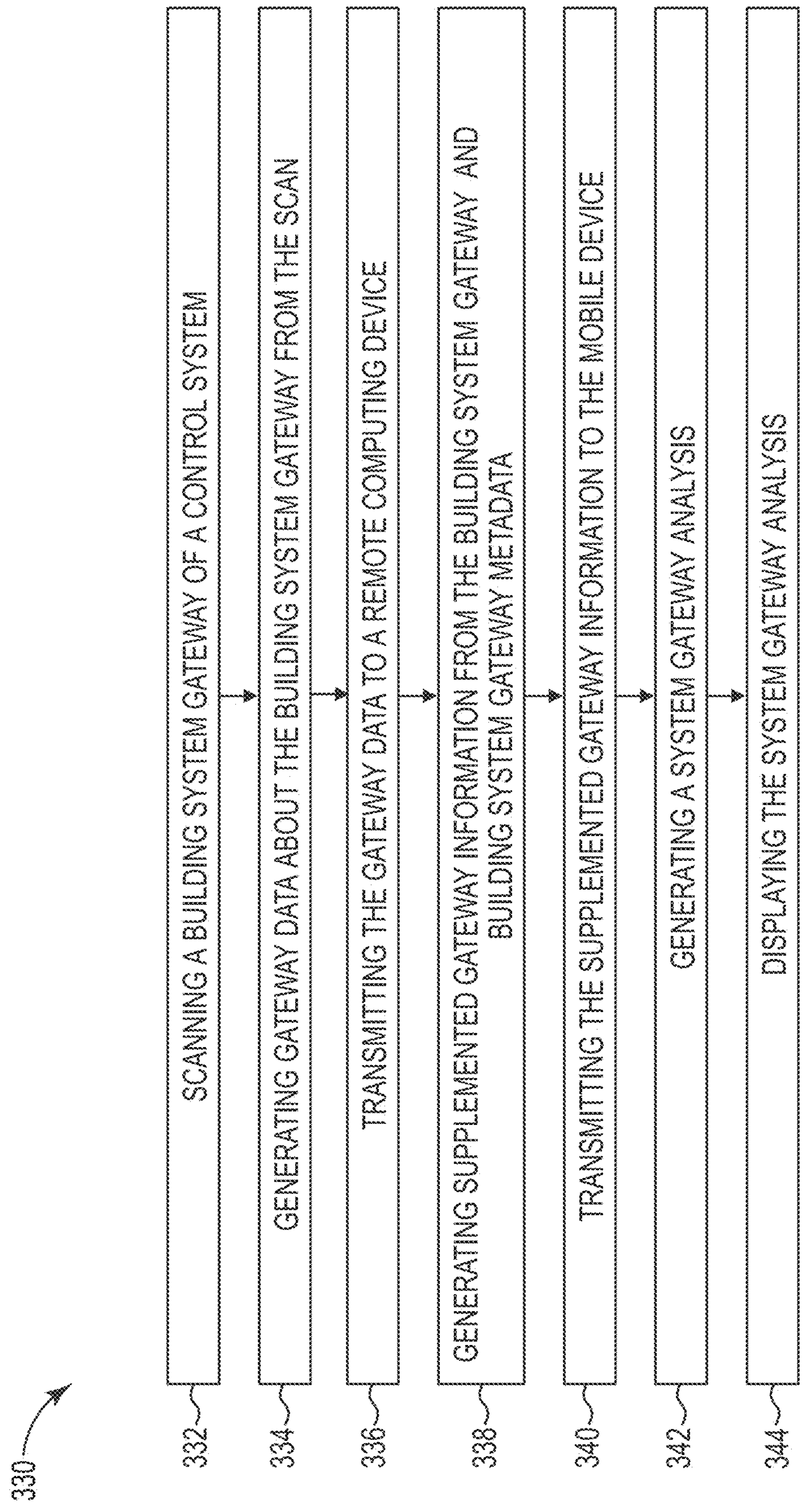
FIG. 3 is an example of a method for a system gateway analysis, in accordance with one or more embodiments of the present disclosure.

FIG. 3 is an example of a method 330 for a system gateway analysis, in accordance with one or more embodiments of the present disclosure. The method 330 can be performed by, for example, a mobile device and a remote computing device.

At 332, the method 330 includes scanning, by a camera of a mobile device, a building system gateway of a control system. For example, the camera can scan a UI, LEDs, and/or an identifier of the building system gateway.

At 334, the method 330 includes generating, by the mobile device, gateway data about the building system gateway from the scan. For example, information presented on the UI, colors/patterns of the LEDs, and/or an identifier captured by the camera can be included in gateway data generated after the scan of the building system gateway.

At 336, the method 330 includes transmitting, by the mobile device, the gateway data to a remote computing device. At 338, the method 330 includes generating, by the remote computing device, supplemented gateway information from the building system gateway and building system gateway metadata. The remote computing device can receive the building system gateway metadata from the building system gateway at predetermined intervals. At 340, the method 330 includes transmitting, by the remote computing device, the supplemented gateway information to the mobile device.

At 342, the method 330 includes generating, by the mobile device based on the supplemented gateway information, a system gateway analysis. The system gateway analysis can include setup information for the system, status information for the system (e.g., and for devices within the system), and/or troubleshooting information for the system (e.g., and for devices within the system).

At 344, the method 330 includes displaying, by the mobile device, the system gateway analysis. The mobile device can display the system gateway analysis in an AR environment via a UI of the mobile device.

Figure 4:
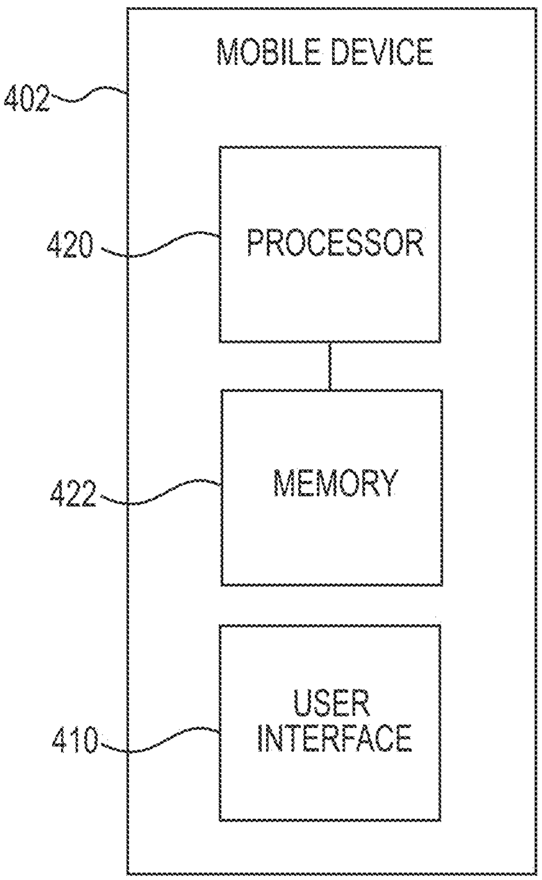
FIG. 4 is an example of a mobile device for a system gateway analysis, in accordance with one or more embodiments of the present disclosure.

FIG. 4 is an example of a mobile device 402 for a system gateway analysis, in accordance with one or more embodiments of the present disclosure. As illustrated in FIG. 4, the mobile device 402 can include a memory 422 and a processor 420 for system gateway analysis in accordance with the present disclosure.

The memory 422 can be any type of storage medium that can be accessed by the processor 420 to perform various examples of the present disclosure. For example, the memory 422 can be a non-transitory computer readable medium having computer readable instructions (e.g., executable instructions/computer program instructions) stored thereon that are executable by the processor 420 for system gateway analysis in accordance with the present disclosure.

The memory 422 can be volatile or nonvolatile memory. The memory 422 can also be removable (e.g., portable) memory, or non-removable (e.g., internal) memory. For example, the memory 422 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 422 is illustrated as being located within mobile device 402, embodiments of the present disclosure are not so limited. For example, memory 422 can also be located internal to another computing resource (e.g., enabling computer readable instructions to be downloaded over the Internet or another wired or wireless connection).

The processor 420 may be a central processing unit (CPU), a semiconductor-based microprocessor, and/or other hardware devices suitable for retrieval and execution of machine-readable instructions stored in the memory 422.

As shown in FIG. 4, the mobile device 402 includes a user interface 410. For example, the user interface 410 can display a system gateway analysis (e.g., as previously described in connection with FIGS. 1-3). A user (e.g., operator) of the mobile device 402 can interact with the mobile device 402 via user interface 410. For example, user interface 410 can provide (e.g., display and/or present) information to the user of the mobile device 402, and/or receive information from (e.g., input by) the user of the mobile device 402. For instance, in some embodiments, user interface 410 can be a graphical user interface (GUI) that can provide and/or receive information to and/or from the user of the mobile device 402. The display can be, for instance, a touch-screen (e.g., the GUI can include touch-screen capabilities). Alternatively, a display can include a television, computer monitor, mobile device screen, other type of display device, or any combination thereof, connected to the mobile device 402 and configured to receive a video signal output from the mobile device 402.

User interface 410 can be localized to any language. For example, user interface 410 can display the system gateway analysis in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for a system gateway analysis, comprising:
- a camera;
- a memory; and
- a processor configured to execute executable instructions stored in the memory to:
  - scan a user interface of a building system gateway of a control system via the camera to capture information presented on the user interface;
- generate gateway data about the building system gateway from the scan of the user interface in response to the scan;
  - transmit the gateway data to a remote computing device;
  - receive, from the remote computing device, supplemented gateway information for the building system gateway; and
  - generate, based on the supplemented gateway information and in response to the scan, a system gateway analysis including status information for the building system gateway and status information for a plurality of event devices included in the control system.

2. The mobile device of claim 1, wherein the information presented on the user interface includes information about the building system gateway.

3. The mobile device of claim 1, wherein the information presented on the user interface includes information about a control panel associated with the building system gateway.

4. The mobile device of claim 1, wherein the information presented on the user interface includes information about the plurality of event devices.

5. The mobile device of claim 1, wherein the system gateway analysis further includes setup information for the control system.

6. The mobile device of claim 1, wherein the system gateway analysis further includes troubleshooting information for the control system.

7. The mobile device of claim 1, wherein:
- the mobile device further comprises a user interface; and
- the processor is configured to display the system gateway analysis on the user interface.

8. The mobile device of claim 1, wherein the processor is configured to display the system gateway analysis in an augmented reality (AR) environment.

9. A system for a system gateway analysis, comprising:
- a building system gateway of a control system, wherein the building system gateway includes a user interface;
- a mobile device including a user interface and a camera, wherein the mobile device is configured to:
  - scan the user interface of the building system gateway via the camera;
  - generate gateway data about the building system gateway from the scan of the user interface;

transmit the gateway data to a remote computing device;

receive, from the remote computing device, supplemented gateway information for the building system gateway;

generate, based on the supplemented gateway information and in response to the scan, a system gateway analysis including status information for the building system gateway and status information for a plurality of event devices included in the control system; and display the system gateway analysis on the user interface of the mobile device; and the remote computing device, wherein the remote computing device is configured to:

receive the gateway data from the mobile device;

generate the supplemented gateway information from the gateway data and building system gateway metadata; and transmit the supplemented gateway information to the mobile device.

10. The system of claim 9, wherein the remote computing device is configured to generate the supplemented gateway information by correlating the gateway data with building system gateway metadata.

11. The system of claim 9, wherein the supplemented gateway information indicates an event device of the plurality of event devices detected an event.

12. The system of claim 11, wherein the supplemented gateway information indicates a type of the event detected by the event device.

13. The system of claim 11, wherein the supplemented gateway information indicates a type of the event device that detected the event.

14. The system of claim 11, wherein the supplemented gateway information indicates a location in a facility that the event device that detected the event is located.

15. The system of claim 11, wherein the supplemented gateway information indicates when the event was detected.

16. A method for system gateway analysis, comprising:

scanning, by a camera of a mobile device, a user interface of a building system gateway of a control system to capture information about the building system gateway presented on the user interface;

generating, by the mobile device, gateway data about the building system gateway from the scan;

transmitting, by the mobile device, the gateway data to a remote computing device;

generating, by the remote computing device, supplemented gateway information from the building system gateway and building system gateway metadata;

transmitting, by the remote computing device, the supplemented gateway information to the mobile device;

generating, by the mobile device based on the supplemented gateway information and in response to the scan, a system gateway analysis including status information for the building system gateway and status information for a plurality of event devices included in the control system; and displaying, by the mobile device, the system gateway analysis on a user interface of the mobile device.

17. The method of claim 16, wherein the method includes scanning, by the mobile device, the user interface of the building system gateway in response to predetermined permissions associated with a user account including the building system gateway.

18. The method of claim 17, wherein the method includes generating, by the remote computing device, the supplemented gateway information including at least one of the gateway data, metadata of the building system gateway, and metadata from a plurality of building system gateways associated with the user account.

19. The method of claim 16, wherein the method includes displaying, by the mobile device, the system gateway analysis in an augmented reality (AR) environment including augmented graphical representations of the system gateway analysis on the user interface of the mobile device.

20. The method of claim 16, wherein the method further includes transmitting, by the building system gateway, the building system gateway metadata to the remote computing device at predetermined intervals.

* * * * *